(12) United States Patent
Tran

(10) Patent No.: US 9,050,938 B2
(45) Date of Patent: Jun. 9, 2015

(54) LICENSE PLATE RETENTION SYSTEM INTEGRATED WITH VEHICLE APERTURE

(71) Applicant: Kien Chi Tran, San Francisco, CA (US)

(72) Inventor: Kien Chi Tran, San Francisco, CA (US)

( * ) Notice: Subject to any disclaimer, the term of this patent is extended or adjusted under 35 U.S.C. 154(b) by 232 days.

(21) Appl. No.: 13/898,788

(22) Filed: May 21, 2013

(65) Prior Publication Data
US 2014/0346307 A1 Nov. 27, 2014

(51) Int. Cl.
G09F 7/00 (2006.01)
B60R 13/10 (2006.01)
G09F 7/18 (2006.01)
G09F 7/22 (2006.01)

(52) U.S. Cl.
CPC ......... *B60R 13/105* (2013.01); *Y10T 29/49826* (2015.01); *G09F 7/18* (2013.01); *G09F 2007/1843* (2013.01); *G09F 2007/1865* (2013.01); *G09F 7/22* (2013.01)

(58) Field of Classification Search
CPC ......... B60R 13/105; B60R 13/10; G09F 7/18; G09F 7/22; G09F 2007/1843; G09F 2007/1865; G09F 2007/1895; G09F 21/04
USPC ................. 248/475.1, 479, 480, 481, 288.31, 248/291.1, 299.1, 231.91; 40/200, 209, 40/211; 411/54
See application file for complete search history.

(56) References Cited

U.S. PATENT DOCUMENTS

| | | | |
|---|---|---|---|
| 626,040 A * | 5/1899 | Rowlands | 248/316.3 |
| 1,518,956 A * | 12/1924 | Beitman | 359/602 |
| 3,702,510 A | 11/1972 | Genyk et al. | |
| 4,657,296 A | 4/1987 | Nishii et al. | |
| 5,494,247 A | 2/1996 | Louder | |
| 5,518,350 A | 5/1996 | Kyprios | |
| 5,813,640 A | 9/1998 | Koch et al. | |
| 6,757,998 B1 | 7/2004 | Lucatorto | |
| 7,401,427 B2 | 7/2008 | Zander | |
| 7,594,347 B2 | 9/2009 | Anderson | |
| 7,752,785 B2 | 7/2010 | Beer et al. | |
| 7,818,905 B1 | 10/2010 | Stahel et al. | |
| 7,877,908 B2 | 2/2011 | Collins | |
| 8,136,854 B2 | 3/2012 | Rich | |
| 8,245,996 B1 | 8/2012 | Ciabaszewski | |

* cited by examiner

*Primary Examiner* — Anita M King
(74) *Attorney, Agent, or Firm* — Steven A. Nielsen; www.NielsenPatents.com

(57) ABSTRACT

A license plate holder system 100 may comprise a license plate frame system 300, swivel attachment rod 300, expansion fastener 200, end screw 365 and other components. A pair of swivel clamps 350 provide pivotal attachment along a Y axis upon a horizontal adjustment bar 435 and pivotal attachment along a X axis upon a swivel attachment rod 300. The horizontal adjustment bar 435 may be moved along the Y axis by adjustment of a fastener 436 located with a vertical channel 430 of the license plate frame system. A proximal end of the swivel attachment rod may comprise an outside flange collar 380 and center void 390, the center void defined by inside female threads 385. A specialized expansion fastener 200 and end screw 365 may be inserted into an aperture and then hand tightened by rotation in either direction.

8 Claims, 17 Drawing Sheets

LICENSE PLATE RETENTION SYSTEM INTEGRATED WITH VEHICLE APERTURE

BACKGROUND OF THE INVENTION (1) Field of the Invention

The invention generally relates to license plate holders for motor vehicles. More particularly, the invention relates to means and methods of securing a license plate holder within an aperture of a vehicle frame or bumper.

(2) Description of the Related Art

Several vehicle license plate holders are known in the related art. For example, U.S. Pat. No. 8,245,996 issued on Aug. 21, 2012 by Ciabaszewski discloses a retractable license plate bracket system using lengthy parts attached to the frame of a vehicle. The Ciabaszewski disclosure requires the addition of many parts and the use of several points of attachment.

U.S. Pat. No. 3,702,510 issued on Nov. 14, 1972 by Genyk et al discloses a spring and pivot system with an unusually high level of complexity. A plate is held under tension with a spring and presents a finger trap with a potential for personal injury to an installer.

U.S. Pat. No. 6,729,053 issued on May 4, 2004 by Castro and assigned to Toyota discloses an artful hook and flange system, but the Toyota system works only with front bumpers having an air scoop. Drivers, as they mature, often eschew the air scoop look.

U.S. Pat. No. 7,752,758 issued on Jul. 13, 2010 by Beer et al and assigned to Porsche discloses an artful fastener system, but requires the use of a traditional face plate upon the front of a vehicle.

BRIEF SUMMARY OF THE INVENTION

The present invention overcomes shortfalls in the related art by presenting an unobvious and unique combination and configuration of license plate attachment systems comprising a license plate frame system, swivel attachment rod, expansion fastener, end screw, swivel clamps and other components.

An expansion fastener, end screw and swivel attachment rod fit into a vehicle aperture system without the use of tools and without the need to recall or use an absolute direction of rotation. The swivel attachment rod may be directly inserted into a vehicle aperture to achieve a desired depth of insertion. The swivel attachment rod may then be rotated in either a clockwise or counterclockwise direction to fasten the swivel attachment rod. By turning the swivel attachment rod in either direction, expansion flanges of the expansion fastener are urged outwardly against the interior walls of the vehicle aperture. The expansion fastener thus fastens the swivel attachment rod within the vehicle aperture.

The artful use of both an inside flange collar of the end screw and an outside flange collar of the swivel attachment rod, and the artful use of inside female threads of the expansion faster matted to outside male threads of the end screw cause the expansion fastener to expand upon rotation in either direction. Thus, shortfalls in the art are overcome by providing a new ease of installation and by the use of simple vehicle aperture systems. Many vehicles are originally manufactured with vehicle aperture systems, thus adding to the utility of the present disclosure.

The license plate frame system, horizontal adjustment bar, swivel caps, rotational bushing, first and second pivotal pin attachments and other components overcome shortfalls in the art by allowing an end user to set a license plate close to a bumper without scratching body work and without using visible attachment components.

These and other objects and advantages will be made apparent when considering the following detailed specification when taken in conjunction with the drawings.

Figure 1:
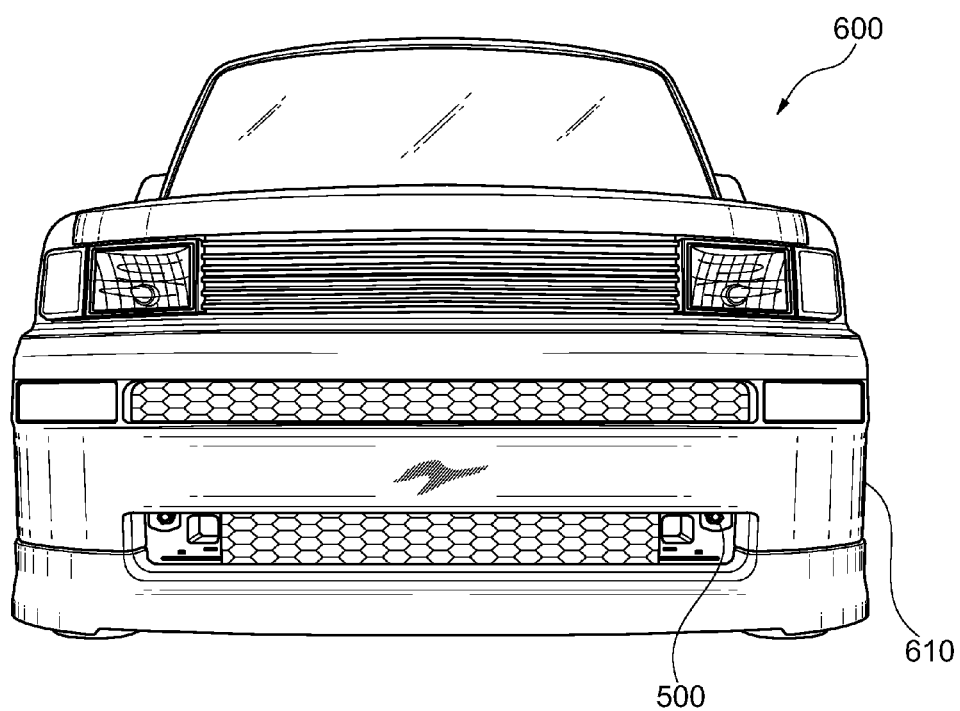
FIG. 1 is a perspective view of a vehicle without a front license plate

REFERENCE NUMERALS IN THE DRAWINGS 100 a license plate attachment system
200 expansion fastener
210 inside female threads of expansion fastener 200
220 expansion flange of expansion fastener 200
221 lateral sides of expansion flanges 220
225 inside beveled flange section of expansion flange 220
230 outside medial collar recess of expansion flange 200
231 inside arch of medial collar recess 230, the inside arch 231 sometimes defining part of an expansion flange void 235
235 expansion flange void, defined by lateral sides 221 of expansion flanges and the outside medial collar recess 230
240 longitudinal walls of expansion flange 200
245 longitudinal void of expansion flange, sometimes defined by two longitudinal walls 240
300 swivel attachment rod
305 distal tip of swivel attachment rod 300
310 flat side of distal tip 305 of swivel attachment rod 300
350 swivel clamp
351 void defined by distal ends of swivel clamps 350
355 first pivot pin or screw of a swivel clamp 350
360 second pivot pin or screw of a swivel clamp 350
365 end screw
367 outside male threads of end screw 365
370 inside flange collar of end screw 365
375 outside flat surface of end screw 365
380 outside flange collar of swivel attachment rod 300

385 inside female threads of swivel attachment rod 300

390 center void of swivel attachment rod, the void defined by the female threads 385 of the swivel attachment rod 400 license plate frame system 410 horizontal member of license plate frame system 400

420 vertical member of license plate frame system 400

421 fasteners sometimes used to secure a license plate 700 to a license plate frame 400

422 fasteners sometimes used to secure a vertical member 420 to a horizontal member 410 of a license plate frame system 425 inside vertical member of license plate frame system 400

430 vertical channel of license plate frame system 400

435 horizontal adjustment bar of license plate frame system 400

436 fastener sometimes in attachment with horizontal adjustment bar 435 and vertical channel 430

440 rotational bushing sometimes attached to horizontal adjustment bar 435

441 raised ridge of rotational bushing 440

442 contraction void of rotational bushing 440

443 attachment channel of rotational bushing 440

500 vehicle aperture system 502 void defined by perimeter of a vehicle aperture system 500

505 alternative vehicle aperture system 510 a block or representation of vehicle component or other component secured to a vehicle aperture system 512 an aperture of a block 510

600 vehicle 610 bumper of vehicle 700 license plate

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Any and all the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

The terms "clockwise", "counter clockwise", "rotation in a first direction" and "rotation in a second direction" are interchangeable and are relevant only in reference to each other.

While disclosed embodiments are generally directed toward the art of securing license plates, other uses are contemplated as the disclosed components and assemblies solve many problems in the art of mechanical attachment.

Referring to FIG. 1 a general vehicle 600 is shown with a bumper 610 with the bumper having a void exposing a vehicle aperture system 500. Many vehicles are manufactured with a vehicle aperture system, sometimes used for towing of other purposes.

Figure 2:
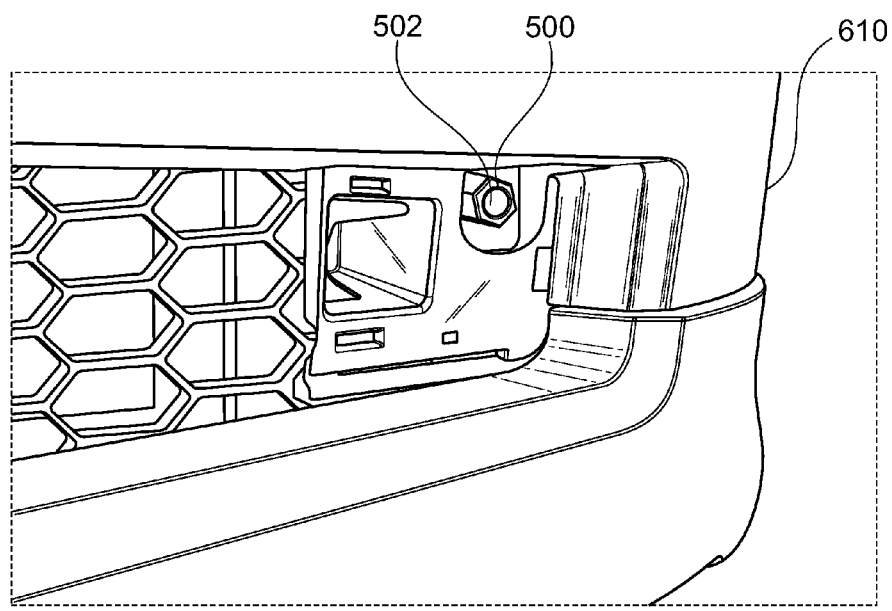
FIG. 2 is a perspective view of a vehicle aperture system ready to accept a license plate holder

FIG. 2 depicts an expanded view of FIG. 1 and more aptly illustrates an aperture system 500 having a void or aperture 502 defined by the perimeter of the vehicle aperture system 500.

Figure 3:
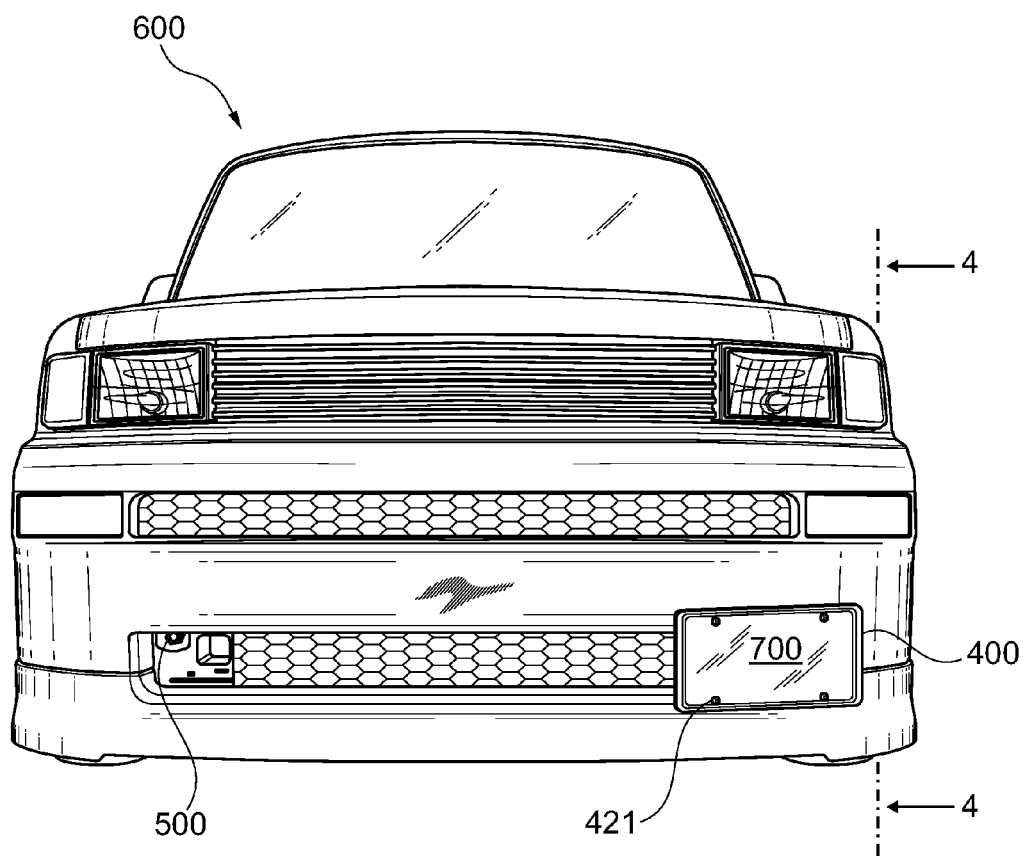
FIG. 3 is a perspective view of a vehicle equipped with a license plate holder

FIG. 3 depicts a license plate 700 attached of a license plate frame system 400, the license plate attached to the license plate frame with fasteners 421.

Figure 4:
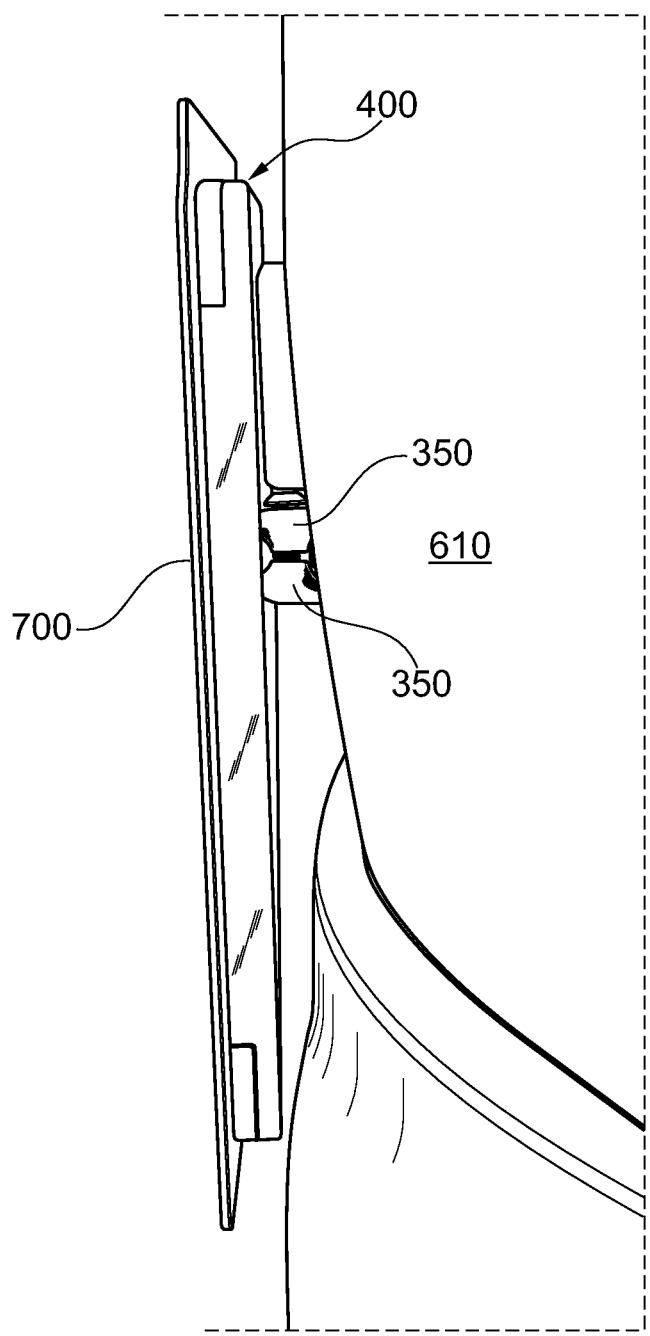
FIG. 4 is a perspective view of an installed license plate holder

FIG. 4 depicts a side view of FIG. 3 and depicts side views of a license plate 700, license plate frame 400, swivel clamps 350 and a bumper 610. FIG. 4 depicts some of the versatility of the license plate system as the license plate is held in close proximity to the bumper. The multiple pivot points assist in the artful positioning of the license plate frame.

Figure 5:
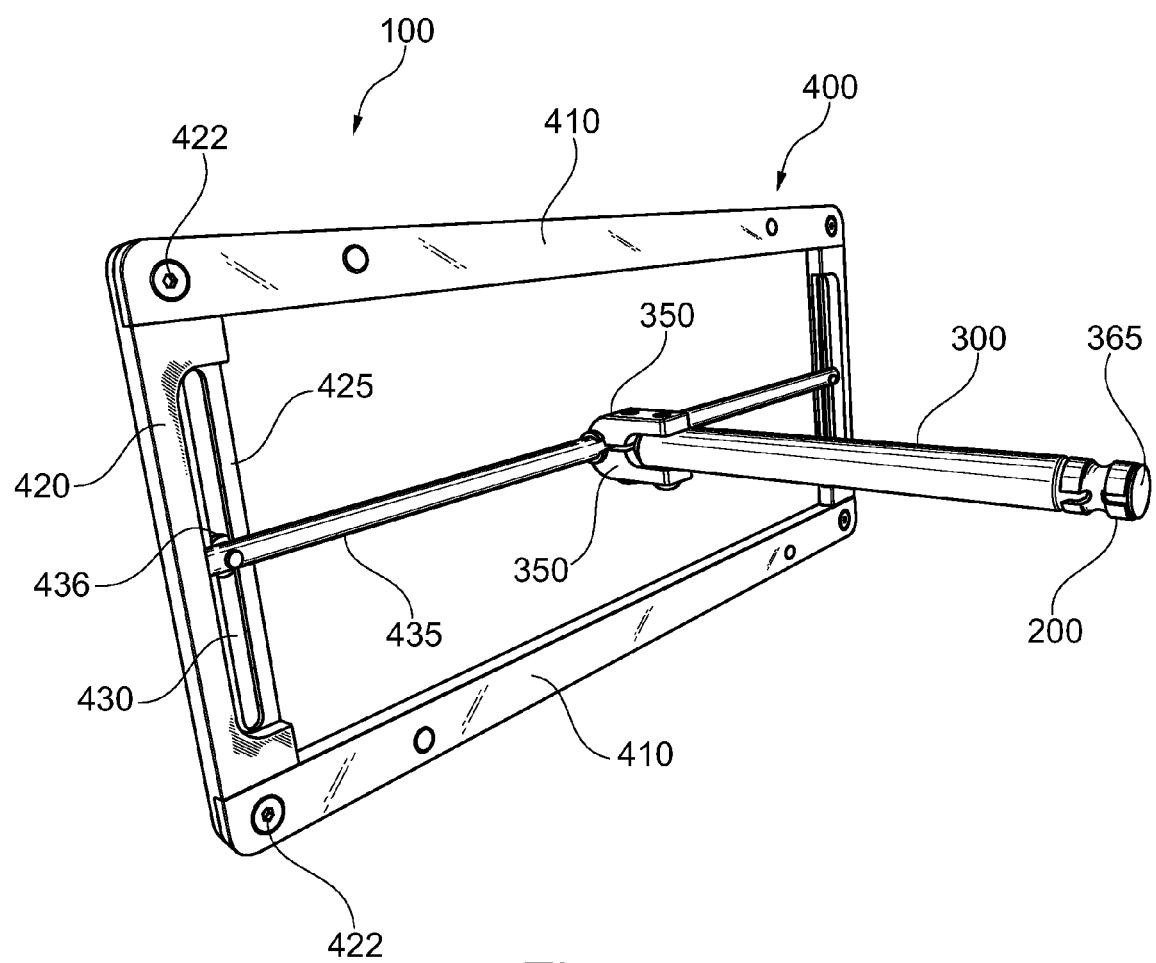
FIG. 5 is a rear side perspective view of a license plate holder assembly

FIG. 5 depicts a license plate attachment system 100 comprising a license plate frame system 400, swivel attachment rod 300, expansion fastener 200 and end screw 365. The license plate frame system 400 may comprise a pair of horizontal members 410, a pair of vertical members 420, a horizontal adjustment bar 435 with the vertical members 420 comprising an inside vertical member 425. A vertical channel 430 may be defined by or defined within the vertical member 420 and an inside vertical member 425. The vertical channel 430 may contain a fastener 436 adjustably securing the horizontal adjustment bare 435 within the vertical channel 430.

Two swivel clamps 350 are shown in pivotal connection with the horizontal adjustment bar 435. The two swivel clamps 350 are also shown in pivotal connection with a swivel attachment rod 300. The end of the swivel attachment rod near the clamps is sometimes called distal while the end of the swivel attachment rod near the end screw is sometimes called proximal. In general, components that are placed more closely to a vehicle are sometimes called proximal and components placed away from a vehicle are sometimes called distal.

The proximal end of the swivel attachment rod 300 is shown with an expansion fastener 200 and an end screw 365.

Figure 6:
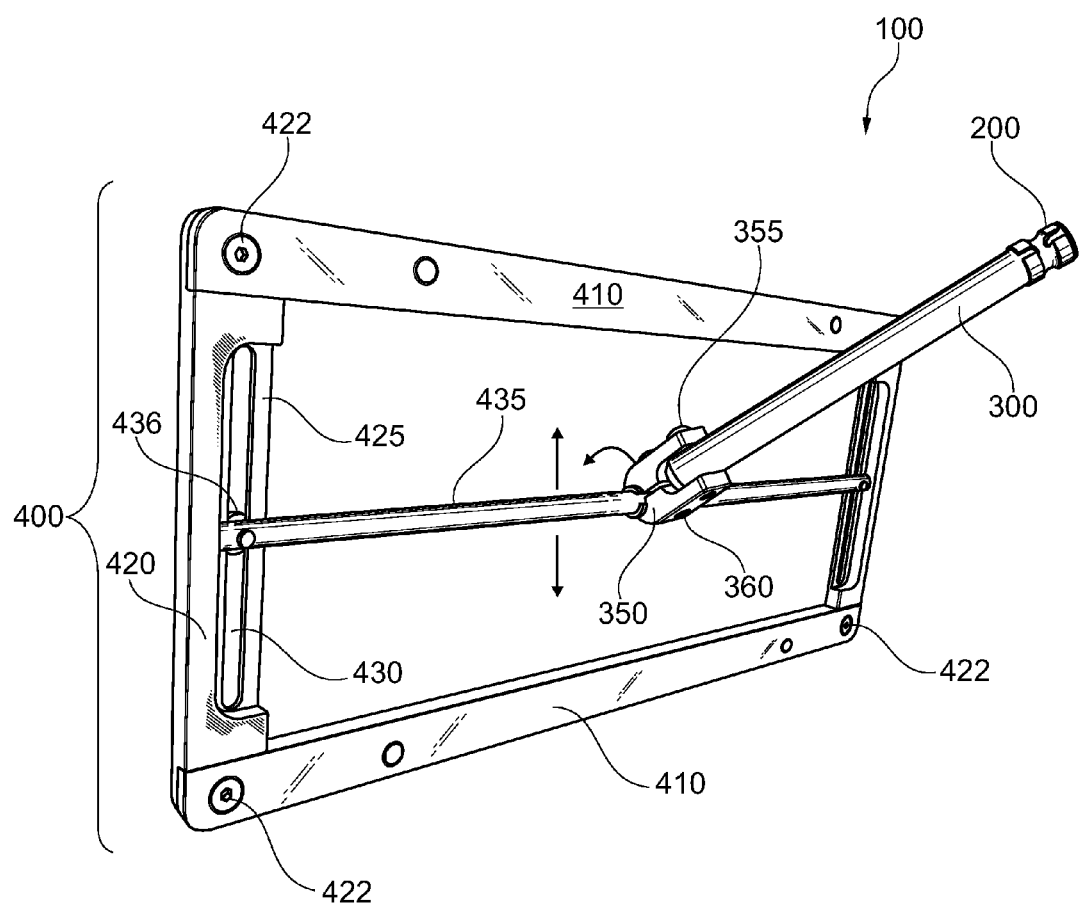
FIG. 6 is a rear side perspective view of a license plate holder assembly

FIG. 6 depicts a license plate attachment system 100 with the swivel attachment rod rotated upwardly and pivoted toward the background. A first pivot pin 355 pivotally secures the swivel attachment rod 300 to the swivel claps 350 allowing the swivel attachment rod to pivot in directions left and right, such directions sometimes referred to as an X axis.

The swivel clamps may be loosened, rotated upwardly or downwardly and tightened in order to rotate the swivel attachment rod in an upward or downward position. Such directions are sometimes referred to as a Y axis. A second pivot pin 360 securing the swivel clamps 350 to the horizontal adjustment bar 435 may be loosened and tightened to achieve an upward or downward positioning of the swivel attachment rod 300.

FIG. 6 further depicts up and down directional arrows on either side of the horizontal adjustment bar 435. The illustrated upward and downward positioning may be accomplished by loosening the fasteners 436 securing the horizontal adjustment bar 435 within the vertical channels 430 of the vertical members 420. The up and down position options for the horizontal adjustment bar allow for a closer fit of a license plate to the frame or body of a vehicle.

A curved directional arrow upon the upper swivel cap illustrates the possible rotation of the swivel caps upon the horizontal adjustment bar 435.

Figure 7:
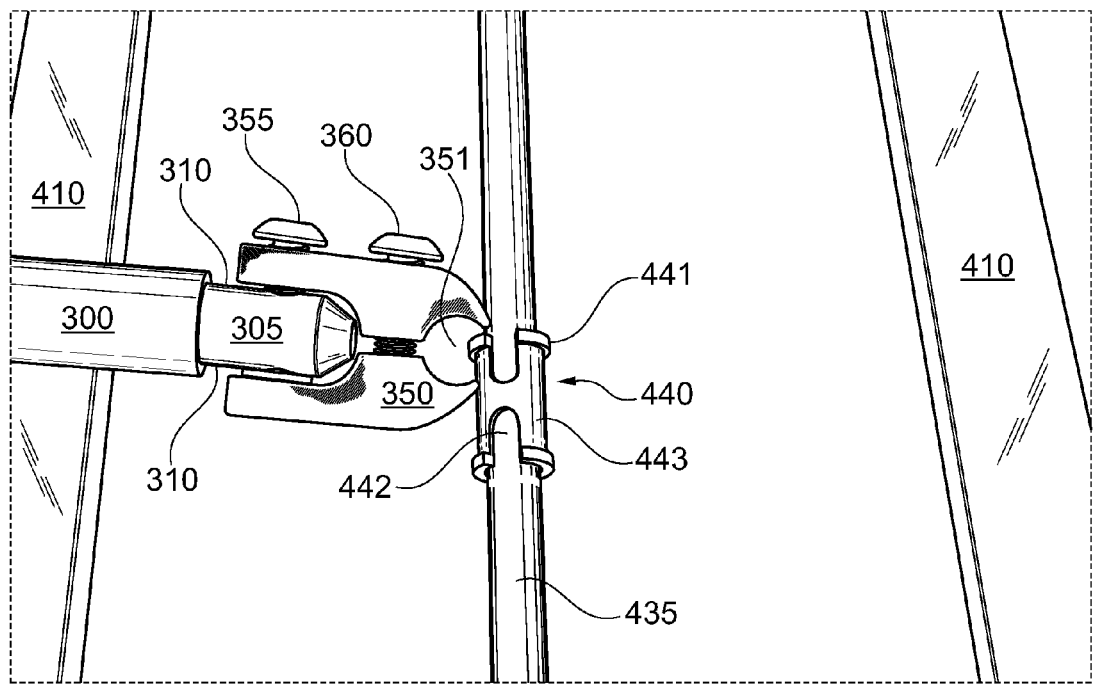
FIG. 7 is a perspective view of swivel attachment rod adjacent to a horizontal adjustment bar

FIG. 7 depicts a horizontal adjustment bar 435 in rotational attachment with a rotational bushing 440, the rotational bushing comprising a pair of raised ridges 441, an attachment channel 443 and a pair of contraction voids 442. The rotational bushing 440 helps to secure the swivel clamps 350 to the horizontal adjustment bar 435. The contraction voids 442 assist in allowing the rotational bushing 440 to compress and thus better secure the swivel clamps 350 to the horizontal adjustment bar 435. The pair of raised ridges 441 help to define the attachment channel, give strength to the rotational bushing and keep the swivel clamps from sliding off.

The distal ends of the swivel clamps 350 define a void 351 that accepts the rotational bushing 440 and horizontal adjustment bar 435.

The swivel attachment rod 300 comprises a distal tip 305 with the distal tip comprising a pair of flat sides 310, the flat sides having a void, the void accepting a first pivot pin 355 of the swivel cap. The first pivot pin 355 facilities left and right rotation of the swivel attachment rod 300.

A second pivot pin 360 or screw has threads complementary to threads found in a void at the distal ends of the swivel clamps. The second pivot pin 360 or screw assists in securing the swivel clamps to the rotational bushing 440 and horizontal adjustment bar 435.

Figure 8:
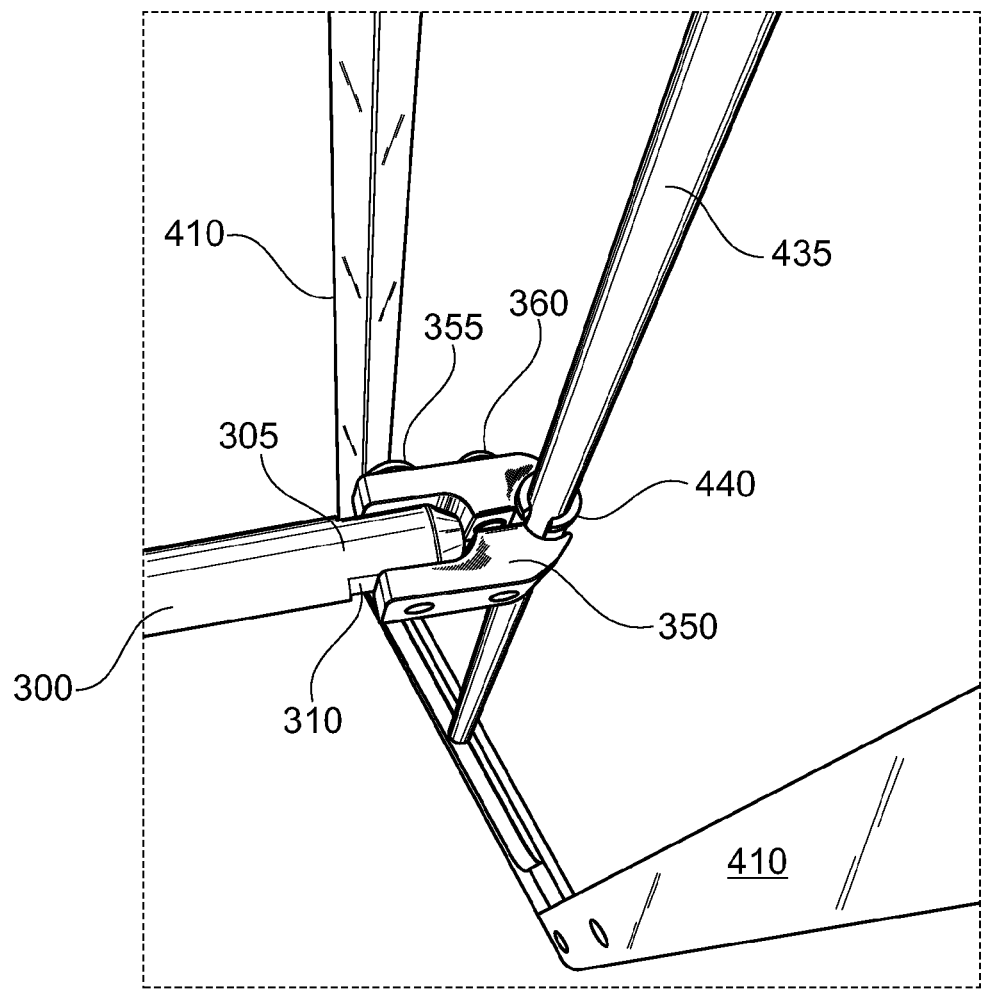
FIG. 8 is a perspective view of swivel attachment rod attached to a horizontal adjustment bar

FIG. 8 depicts a pair of swivel clamps 350 attached to a rotational bushing 440 and horizontal adjustment bar 435. The flat side 310 of the distal tip 305 of the swivel attachment rod is shown with a first pivot pin or screw 355. Flat sides 310 facilitate the rotational movement of the swivel clamps along the axis of the first pivot pin 355 or screw.

Figure 9:
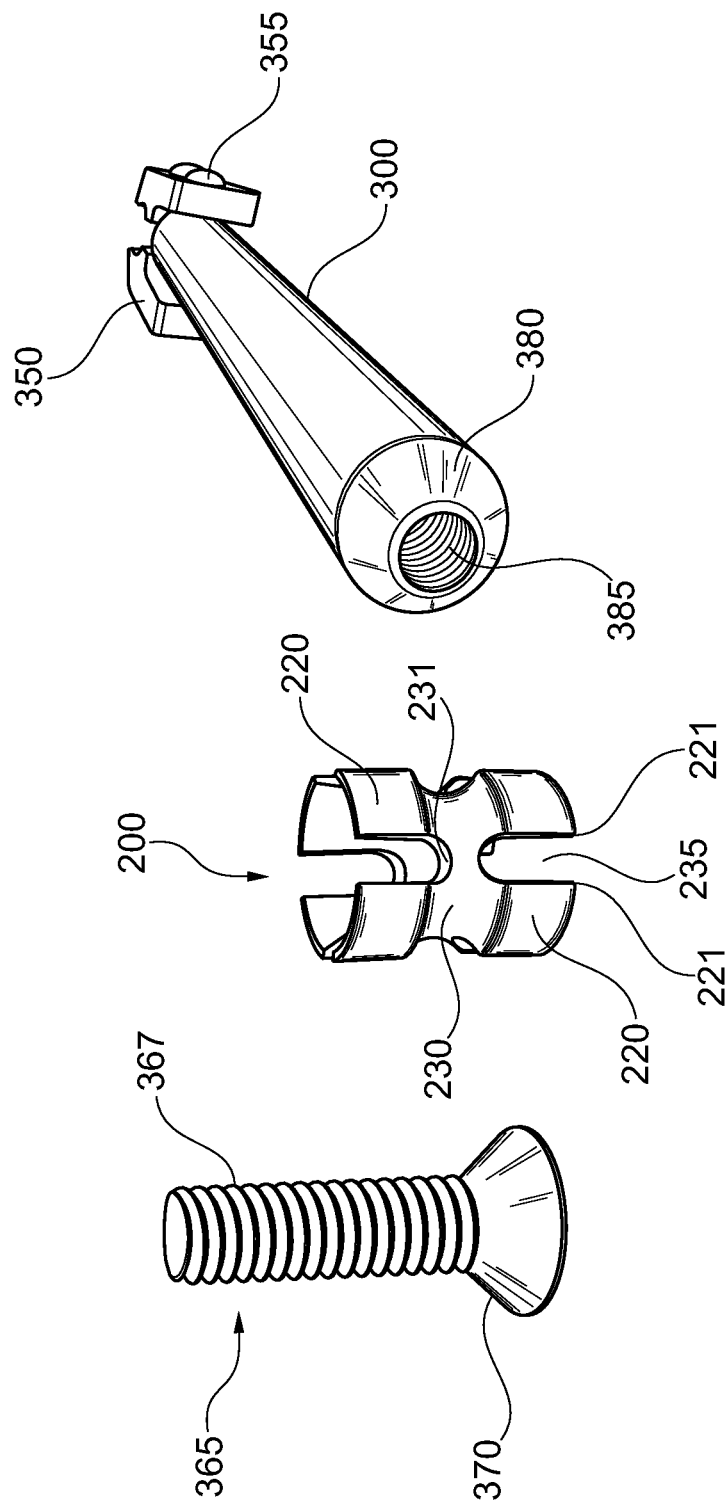
FIG. 9 is a perspective view of an end screw, expansion fastener and a swivel attachment rod

FIG. 9 depicts an end screw 365, expansion fastener 200 and swivel attachment rod 300. The end screw 365 is shown with outside male threads 367 and an inside flange collar 370. The expansion fastener 200 is shown with a plurality of expansion flanges 220, a plurality of inside arches 231, an outside medial collar 230, a plurality of lateral sides 221 of the expansion flanges and a plurality of expansion flange voids 235 defined by lateral sides 221 and outside medial collar recesses 230. The swivel attachment rod 300 is shown with inside female threads 385, an outside flange collar 380, a pair of swivel clamps 350 and a first pivot pin or screw pivotally attached to the pair of swivel clamps 350.

Figure 10:
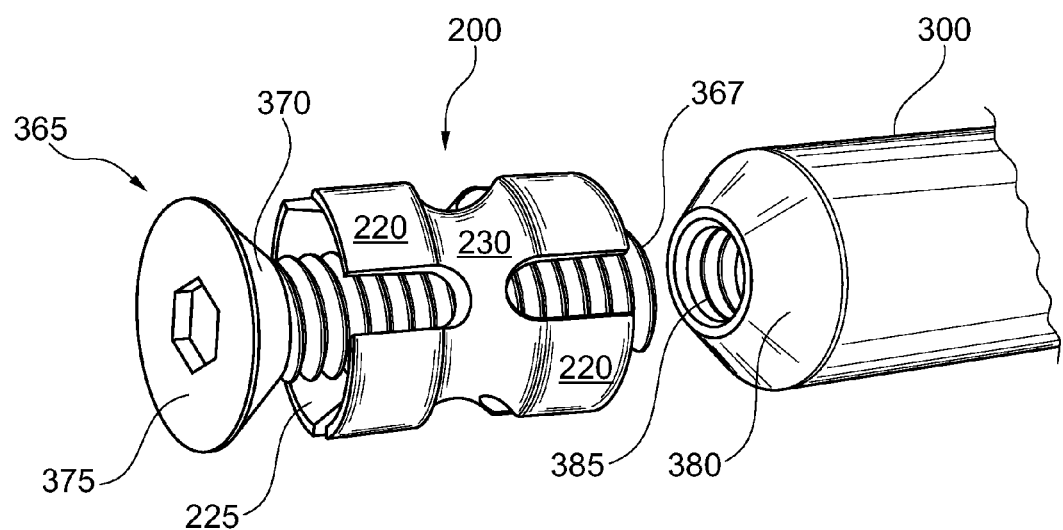
FIG. 10 is a perspective view of an end screw, expansion fastener and a swivel attachment rod

FIG. 10 depicts an end screw 365 having an outside flat surface 375, an inside flange collar 370 and outside male threads 367. The outside male threads 367 are mated with inside female threads of the expansion fastener 200. The swivel attachment rod 300 is shown with an outside flange collar 380 and inside female threads 385.

The inside female threads 385 of the swivel attachment rod 300 are of a limited distance within the swivel attachment rod such that the end screw stops rotation before fully expanding expansion flanges 220 of an expansion fastener 200.

After the end screw 365, with the expansion flange, is screwed into the swivel attachment rod, the swivel attachment rod may be inserted into an aperture, and secured within the aperture by hand rotation in either a clockwise or counterclockwise direction. The aperture may be of a relatively smooth interior surface and be sized such that the expansion flange 200 is in relatively slight friction with the inside walls of the aperture. The expansion flange voids 235 and the longitudinal void 245 (shown in FIG. 13) assist in giving the expansion flanges an outward bias, so as to apply slight friction to the walls of an aperture, but yet flex inwardly as the expansion faster 200 is rotated toward and upon the outside flange collar 380 of the swivel cap or is rotated toward and upon the inside flange collar 370 of the end screw 365.

The symmetrical nature and other attributes of the expansion fastener 200 allow an end user to hand insert and hand tighten a license plate holder into an aperture without the need to remember an absolute rotational direction for either tightening or loosening the license plate holder. The beveled walls of the inside flange collar 370 and outside flange collar 380 are between 35 to 65 degrees. In the best mode known to date, the flange walls are 45 degrees.

Figure 11:
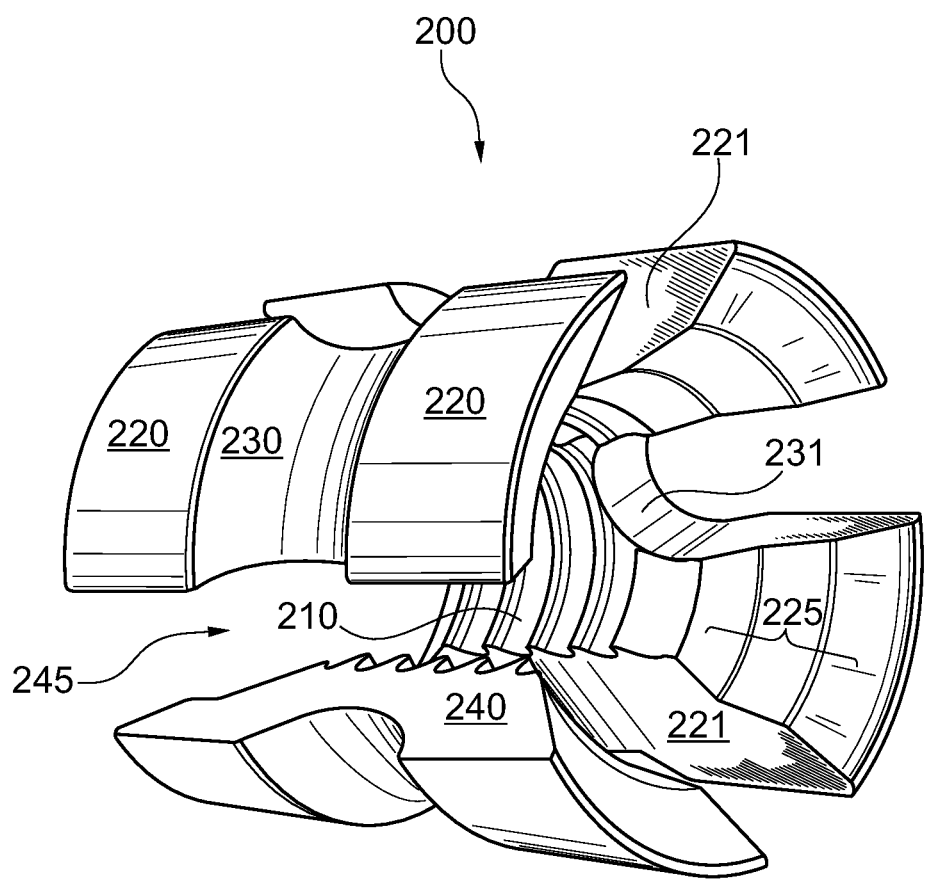
FIG. 11 is a perspective view of an expansion fastener

FIG. 11 depicts a perspective view of an expansion fastener 200 having a pair of longitudinal walls 240 defining a longitudinal void 245. Inside female threads 210 may be found upon the inside wall sections of the outside medial collar recess 230. Inside beveled flange sections 225 may have multiple circular segments or may be smooth in surface. Inside beveled flange sections 225 may be pressed or urged outwardly when rotated toward or upon the outside flange collar 380 or inside flange collar 370. The outward movement may press the expansion flanges 220 outwardly so as to lock up or be secured within the walls of an aperture. The expansion flanges 220 are shown to be defined by inside arches 231 and lateral sides 221. The outside medial collar recess 230 may have a lower elevation as compared to the expansion flanges 220.

Figure 12:
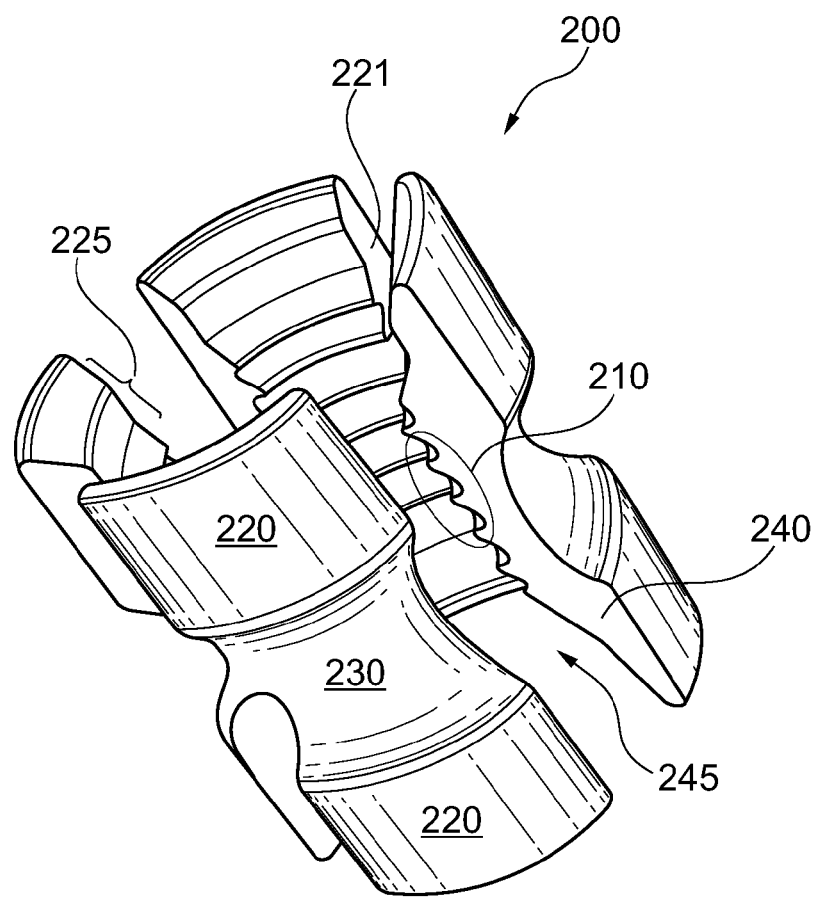
FIG. 12 is a perspective view of an expansion fastener

FIG. 12 provides another view of an expansion fastener 200. Disclosed multiple surfaces of the inside beveled flange section 225 are shown, but smooth embodiments are also disclosed. The inside female threads 210 are shown to be carved within the inside walls of the outside medial collar recess 230 but other embodiments are contemplated.

Figure 13:
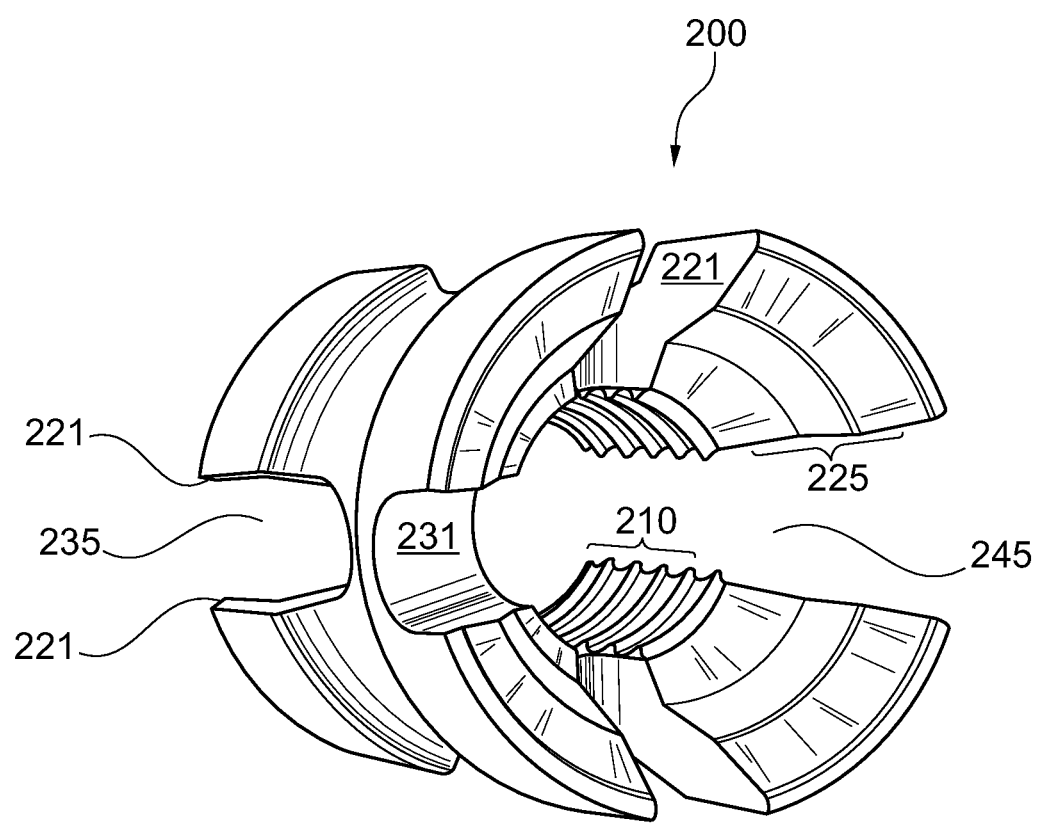
FIG. 13 is a perspective view of an expansion fastener

FIG. 13 provides yet another perspective view of an expansion fastener 200. The angle of the inside beveled flange section 225 may be between 25 to 65 degrees with a best mode known to date being 45 degrees.

Figure 14:
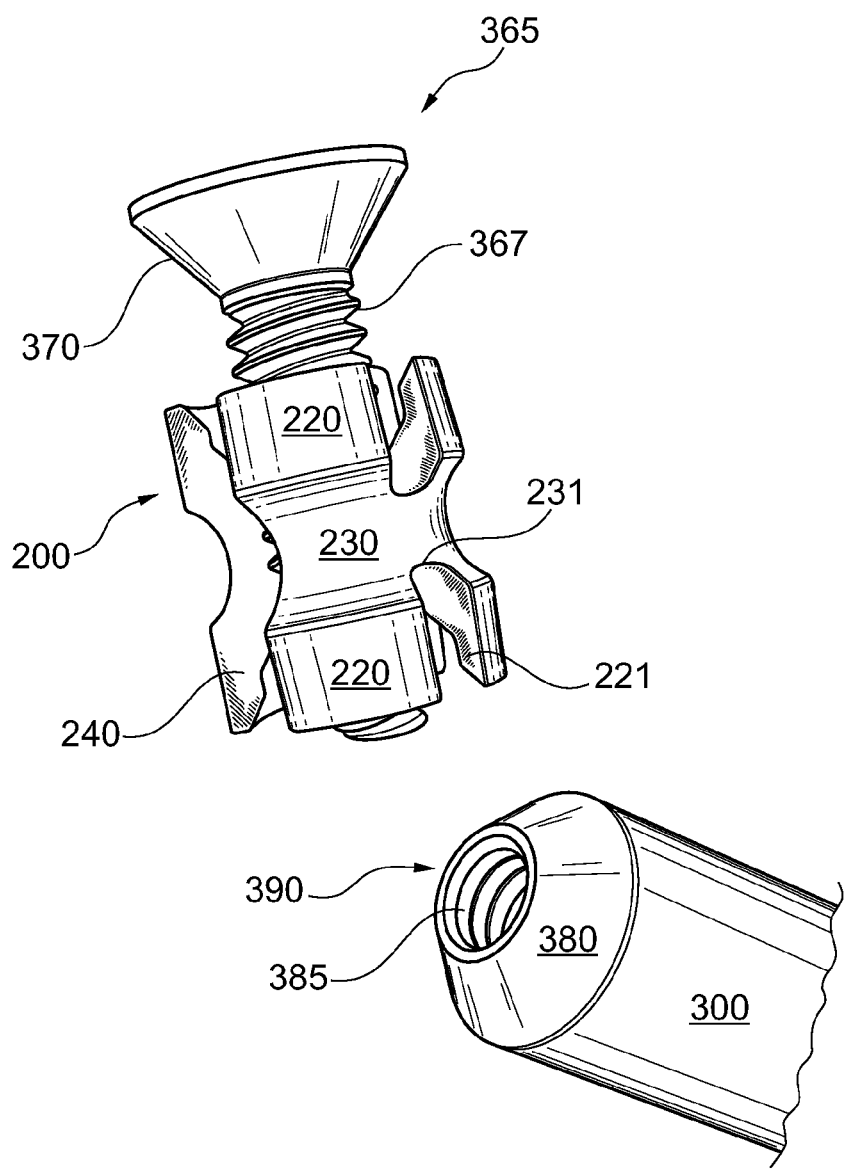
FIG. 14 is a perspective view of an expansion fastener, end screw and swivel attachment rod

FIG. 14 depicts a perspective view of an expansion fastener 200 attached to an end screw 365 ready for insertion into a center void 390 of the swivel attachment rod. The center void may be defined by inside female threads 385. The center void 390 may be of a finite depth so as to not overly expand the expansion fastener upon screwing in the end screw 365.

Figure 15:
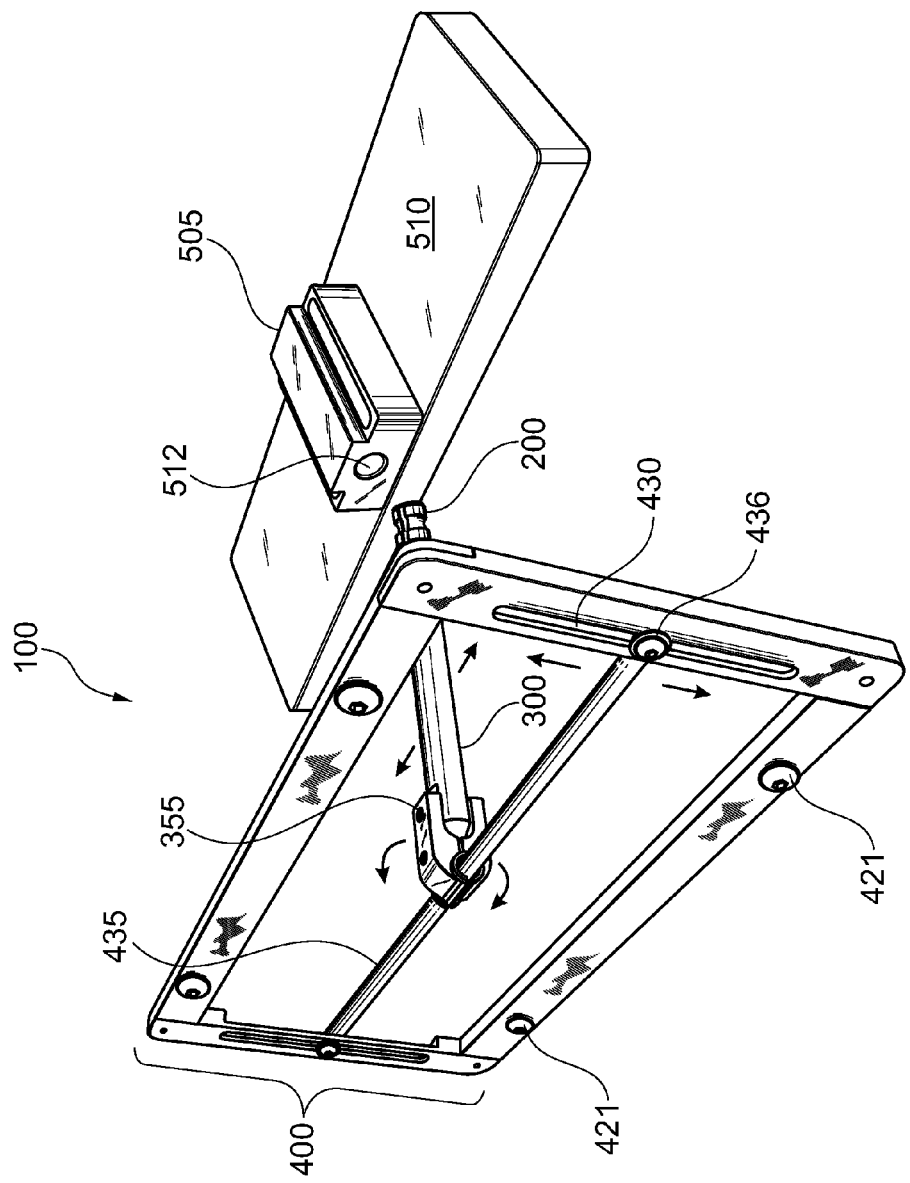
FIG. 15 is a perspective view of a license plate system

FIG. 15 depicts a perspective view of a license plate attachment system 100 sometimes comprising a license plate frame system 400 and other components. The horizontal adjustment bar 435 is illustrated with directional arrows showing possible movement within the vertical channels 430. A fastener 436 may be in attachment with the horizontal adjustment bar 435 and a vertical channel to facilitate the movement of the horizontal adjustment bar.

Curved directional arrows adjacent to the swivel clamps and horizontal adjustment bar 435 show vertical angle adjustments of the swivel attachment rod. Straight directional arrows adjacent to the swivel attachment rod 300 show horizontal adjustment positions available by rotation at the first pivot pin 355 or screw of the swivel clamps.

A block 510 is shown in attachment to an alternative aperture system 505 having an aperture 512. An aperture system may be of any configuration. In the best mode, an aperture system is already found within a vehicle or is easily installed to the front section of a vehicle.

Figure 16:
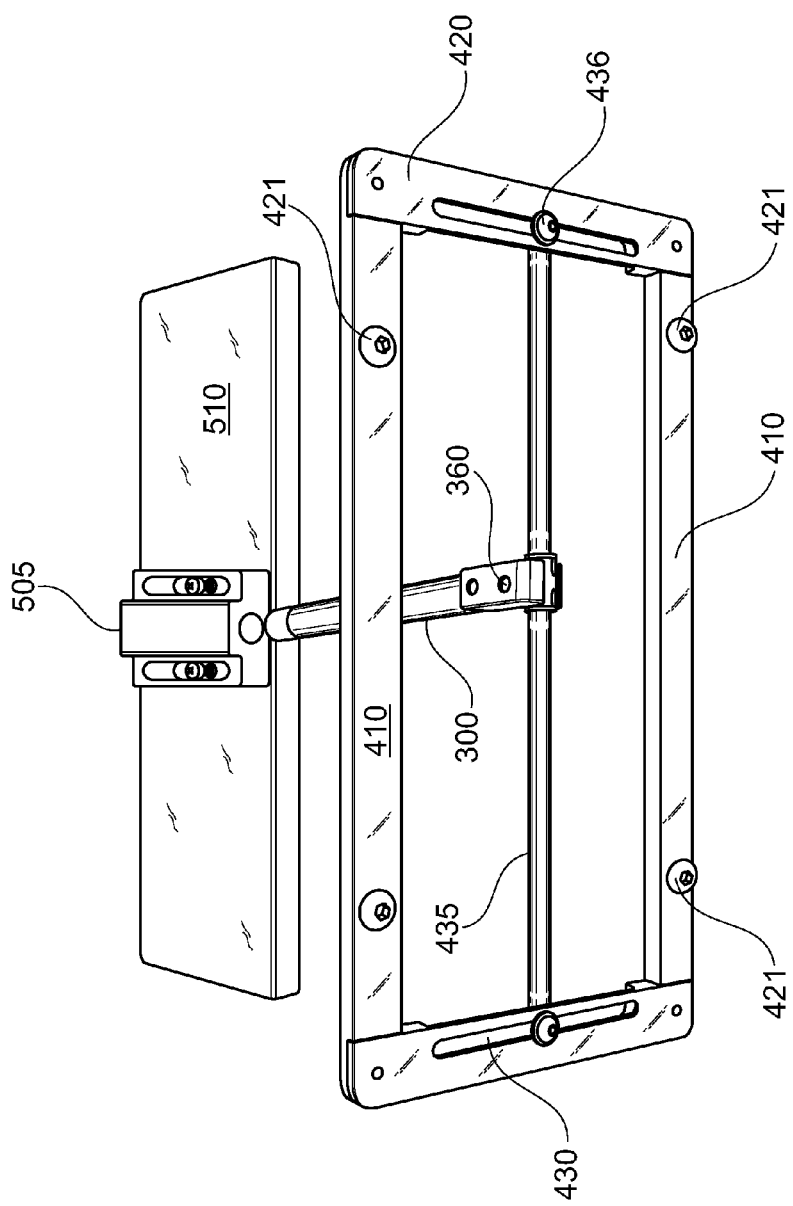
FIG. 16 is a perspective view of a swivel attachment rod positioned for insertion into an aperture

FIG. 16 depicts a disclosed system.

Figure 17:
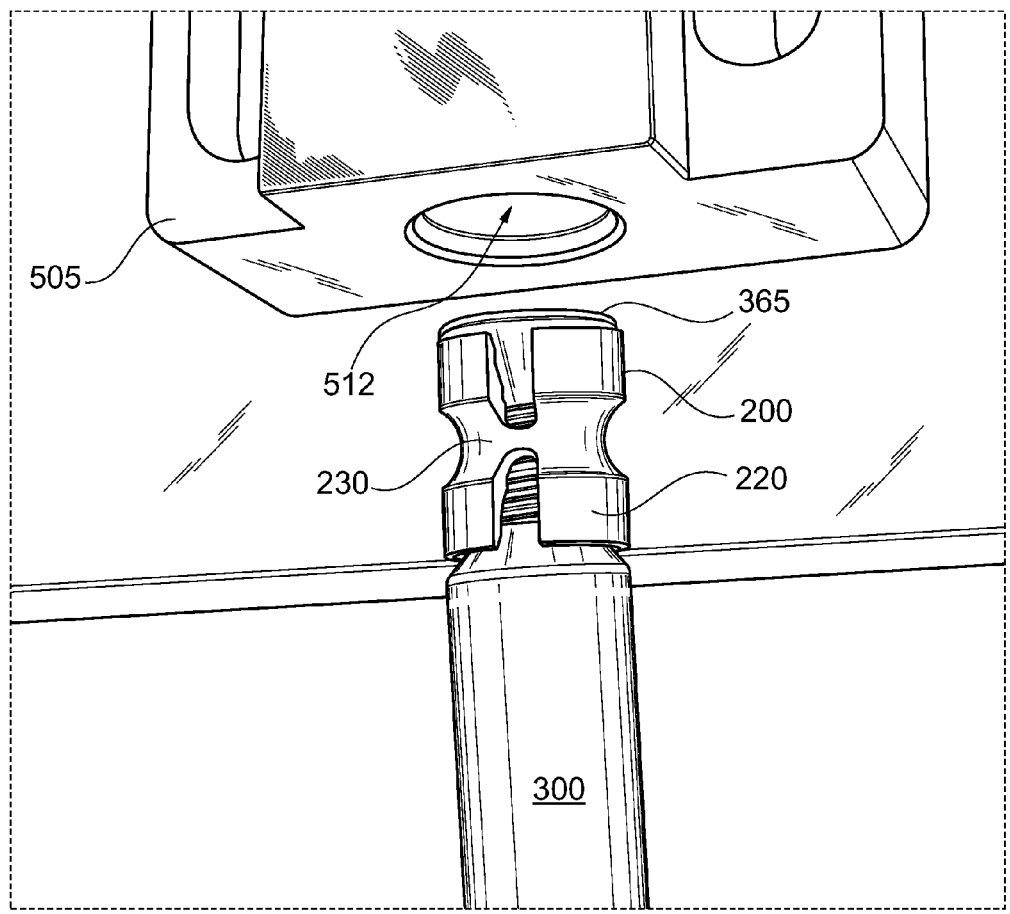
FIG. 17 is a perspective view of a swivel attachment rod positioned for insertion into an aperture

FIG. 17 depicts a swivel attachment rod 300, expansion fastener 200 and end screw 365 in position for insertion into an aperture 512.

The disclosed components allow a user to insert the swivel attachment rod to any depth of the aperture without having to rotate the swivel attachment rod.

Embodiments of the invention may include the following items:

Item 1. A license plate attachment system 100, the system comprising:
a) a license plate frame system 400 in attachment to;
b) a swivel attachment rod 300, the swivel attachment rod attached to;
c) an expansion fastener 200; and
d) an end screw 365 attached to the expansion fastener.

The system of item 1 further comprising a pair of swivel clamps 350 with
a) a first pivot pin 355 in pivotal attachment to the swivel clamps and the swivel attachment rod, and:
b) a second pivot pin 360 securing the swivel clamps to a rotational bushing 440, with the rotational bushing rotationally attached to a horizontal adjustment bar 435, the horizontal adjustment bar attached to the license plate frame system.

Item 3. The system of item 1 wherein the expansion fastener further comprises:
a) inside female threads 210;
b) a plurality of expansion flanges 220, the expansion flanges comprised of lateral sides 221; and
c) an outside medial collar recess 230.

Item 4. The system of item 3 wherein the expansion fastener further comprises:
a) a plurality of expansion flange voids 235, defined by the lateral sides of the expansion flanges and inside arches 231 of the outside medial collar recess; and
b) a longitudinal void 245 defined by two longitudinal walls 240 of the expansion fastener.

Item 5. The system of item 4 wherein the end screw comprises:
a) an inside flange collar; and
b) outside male threads complementary to the inside female threads of the expansion fastener.

Item 6. The system of item 5 wherein the swivel attachment rod further comprises:
a) a proximal end comprising an outside flange collar 370; and
b) a center void 390 defined by inside female treads 385.

Item 7. The system of item 6 wherein the inside female threads are limited in depth within the swivel attachment rod.

Item 8. The system of item 7 wherein the license plate frame system further comprises:
a) a pair of vertical members 420 attached to a pair of horizontal members 410;
b) the vertical members comprising a vertical channel 430 defined by the vertical members and inside vertical members 425.

Item 9. A license plate attachment kit, the kit comprising:
a) a license plate frame system 400;
b) a swivel attachment rod 300;
c) an expansion fastener 200; and
d) an end screw 365.

Item 10. The kit of item 9 further including a pair of swivel clamps 350.

Item 11. The kit of item 10 further including a vehicle aperture system 500.

Item 12. A method of attaching a license plate to a vehicle, the method comprising the steps of:
a) attaching a license plate frame system 400 to a swivel attachment rod 300; and
b) attaching the swivel attachment rod to an expansion fastener 200 and end screw 365.

Item 13. The method of item 12 further comprising the step of inserting the swivel attachment rod, expansion fastener and end screw into a vehicle aperture by pressing the swivel attachment rod to a desired depth and then rotation the swivel attachment rod, either clockwise or counter clockwise to fasten the swivel attachment rod within the vehicle aperture.

What is claimed is:

1. A license plate attachment system, the system comprising:
   a) a license plate frame system fastened to;
   b) a swivel attachment rod, the swivel attachment fastened to;
   c) an expansion fastener;
   d) an end screw attached to the expansion fastener;
   e) a first pivot pin in pivotal attachment to swivel clamps and the swivel attachment rod; and
   f) a second pivot in securing the swivel clamps to a rotational bushing, with the rotational bushing rotationally attached to a horizontal adjustment bar, the horizontal adjustment bar attached to the license plate frame system.

2. The system of claim 1 wherein the expansion fastener further comprises:
   a) inside female threads;
   b) a plurality of expansion flanges, the expansion flanges comprised of lateral sides; and
   c) an outside medial collar recess.

3. The system of claim 2 wherein the expansion fastener further comprises:
   a) a plurality of expansion flange voids, defined by the lateral sides of the expansion flanges and inside arches of the outside medial collar recess; and
   b) a longitudinal void defined by two longitudinal walls of the expansion fastener.

4. The system of claim 3 wherein the end screw comprises:
   a) an inside flange collar; and
   b) outside male threads complementary to the inside female threads of the expansion fastener.

5. The system of claim 4 wherein the swivel attachment rod further comprises:
   a) a proximal end comprising an outside flange collar; and
   b) a center void defined by inside female treads.

6. The system of claim 5 wherein the inside female threads are limited in depth within the swivel attachment rod.

7. The system of claim 6 wherein the license plate frame system further comprises:
   a) a pair of vertical members attached to a pair of horizontal members;
   b) the vertical members comprising a vertical channel defined by the vertical members and inside vertical members.

8. A method of attaching a license plate to a vehicle, the method comprising the steps of:
   a) attaching a license plate frame system to a swivel attachment rod;
   b) attaching the swivel attachment rod to an expansion fastener and end screw; and
   c) inserting the swivel attachment rod, expansion fastener and end screw into a vehicle aperture by pressing the swivel attachment rod to a desired depth and then rotating the swivel attachment rod, either clockwise or counter clockwise to fasten the swivel attachment rod within the vehicle aperture.

* * * * *